United States Patent Office 3,210,088
Patented Oct. 5, 1965

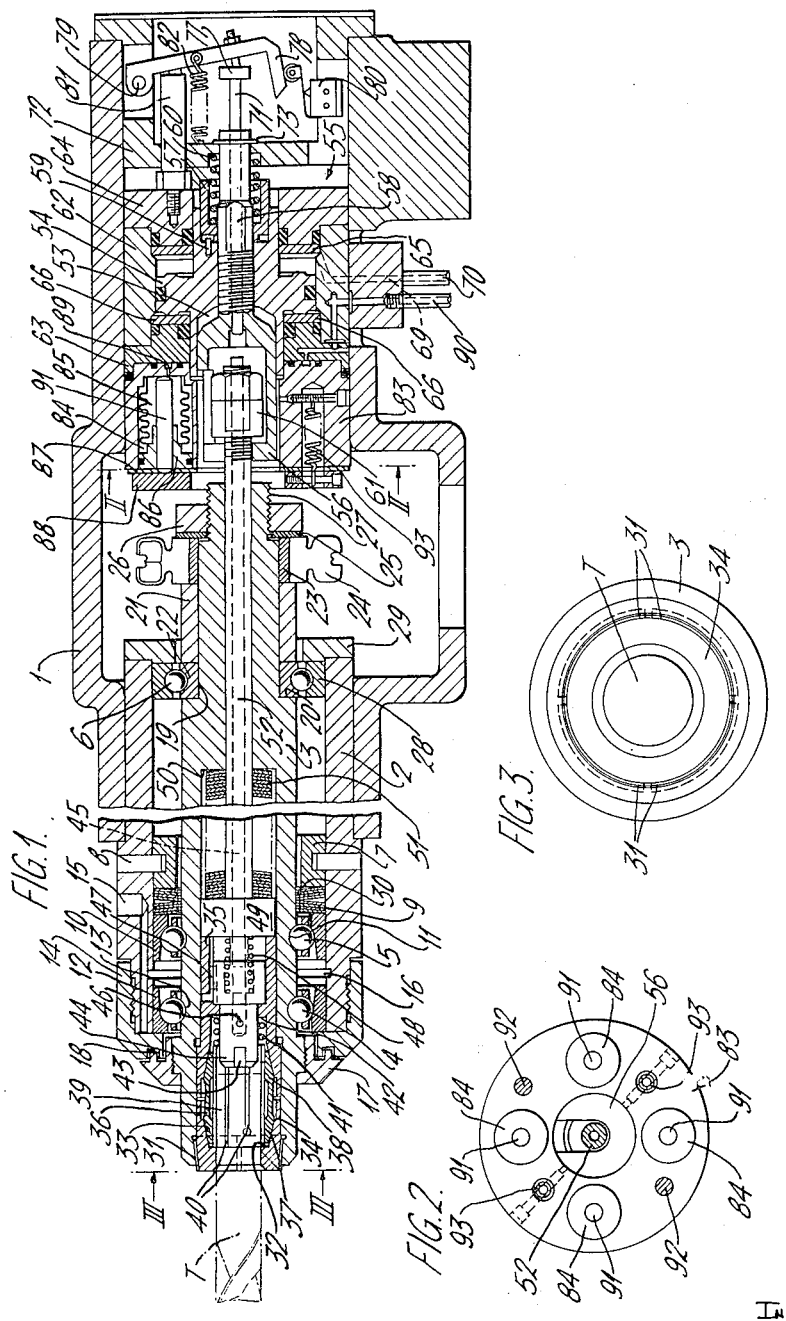

3,210,088
APPARATUS FOR GRIPPING A ROD-LIKE
ARTICLE
David Theodore Nelson Williamson, Cyril Edgar Thomas Smith, and Justin Henry Swarbrick, all of Deptford, London, England, assignors to The Molins Organisation Limited, Deptford, London, England
Filed Nov. 13, 1963, Ser. No. 323,465
Claims priority, application Great Britain, Nov. 21, 1962, 44,063/62
4 Claims. (Cl. 279—4)

This invention concerns improvements in or relating to apparatus for gripping a rod-like article and, in particular, to a rotatable spindle for holding a tool or cutter in a machine tool.

The production of components by numerically controlled machine tools has resulted in predetermined cycles of machining operations requiring a high degree of precision and a considerable reduction in setting-up time. These criteria of precision and speed in their turn have led to the introduction of machine tools having the ability to choose from a tool storage the particular tool or cutter required for the subsequent machining operation. At the end of the operation the cutter is returned to its rightful place in the store, and the tool required for the following operation selected and gripped.

Since the machine tool is numerically controlled, the accuracy with which the tool or cutter is located within the spindle determines the accuracy of the machining operation. Location of the cutter shank radially within the spindle may present no very great problem but axial location has proved to be difficult, particularly when it is desired to locate the cutting end from a datum plate with an accuracy of the order of two-tenths of one-thousandth of an inch. As the tool is gripped in a chuck, there is a tendency for the tool to move axially due to an axial component of force exerted by the gripping member. If such axial movement is uncontrollable, then there is a corresponding loss of accuracy in the machining operation. It is, therefore, considered to be highly desirable to limit any unwanted end movement of the tool or cutter to a figure within the tolerance of the machining operation.

In what follows the expression "forward," when referring to motion, is used to indicate motion parallel with the axis of the gripping member and directed from the gripping member toward the end of the rod-like article, which may be a tool or workpiece, protruding from the gripping member. "Backward" is to be taken to indicate motion in the opposite direction to forward movement. Similarly, "front" is to be taken to indicate that end of an object which could be the leading end if the object were moving forward, while "back" refers to the opposite end.

According to the present invention there is provided a gripping device for gripping a rod-like article in a rotatable spindle, comprising a collet within which the rod-like article is capable of being inserted and having a conical end, housing means within which the collet is located and adapted so that an axial force acting in a forward direction on the housing is partially transmitted through the conical end into a radial force causing the rod-like article to be gripped within the collet and restraining means to restrain forward movement of the housing means relatively to the rotatable spindle in which the housing means fits.

Apparatus in accordance with the invention will now be described by way of example with reference to the accompanying drawings, in which:

FIGURE 1 is a section through a gripping device for use in a machine tool,

FIGURE 2 is a section on the line II—II of FIGURE 1, and

FIGURE 3 is a section on the line III—III of FIGURE 1.

A preferred embodiment in shown in FIGURES 1 and 2, being the high speed cutting head of a numerically controlled machine tool designed for machining aluminium and aluminium alloy components. A casting 1 is stationary and is fixed to a Z axis slide of the machine tool. A quill is fixed to the casting 1. A rotating spindle 3 is positioned within the quill 2, from which it is separated by two angular contact bearings 4 and 5 and a plain ball bearing 6. A locating ring 7 is fixed to the bore of the quill 2 by means of dowels 8. Concave-convex washers 9, known as Belleville washers, separate an outer race 10 of the angular contact bearing 5 and the locating ring 7, and being compressed supply the force necessary to pre-load the balls of the bearing 5 between the outer race 10 and an inner race 11 machined around the spindle 3, thus preventing axial play. The bearing 4 has an outer race 12 which fits into the bore of the quill 2. An inner race 13 is machined around the spindle 3. A lock nut 14 is threaded over the quill 2 and bears against the outer race 12, thus supplying the force necessary to pre-load the balls of the bearing 4. The bearing 4 is fitted to take any forward axial thrust and the bearing 5 to take backward axial thrust. Oil mist lubrication is supplied to both bearings 4 and 5 through a hole 15 and a circumferential channel 16 in the quill 2. A guard ring 17 is threaded on the spindle 3 and provides a labyrinthine passage 18 between it and the lock unt 14, thus preventing the entry of foreign matter without allowing excessive escape of oil.

The back end of the spindle 3 has a reduced diameter 19 and a shoulder 20. A spacer 21 nips the inner race 22 of the ball bearing 6 against the shoulder 20 and is held in position by a hub 23 of a pelton wheel 24. The individual buckets of the pelton wheel 24, which is a high speed wheel operated by an oil jet, are secured to the hub 23 by a lock washer 25, which in its turn is locked into position by an end cap 26 threaded over a further reduced diameter 27 of the spindle 3. The outer race 28 of the ball bearing 6 is held in position by a locking ring 29 secured to the quill 2. Lubrication for the bearing 6 is supplied by the oil mist pressure being transmitted through a clearance 30 between the spindle 3 and the bore of the Belleville washers 9.

The front end of the spindle 3 is bored to mate with the front end of a nose tube 34. The front peripheral end of the nose tube 34 forms a truncated cone, while internally it is provided with a shoulder 32 and a taper 33. Restraining means, in this case a retaining ring 31 (see FIGURES 1 and 3), which for the sake of ease of assembly is split into four quadrants, is interposed between the bore of the spindle 3 and the truncated cone of the nose tube 34. The function of the ring 31 is to cause the nose tube 34 to lock against the internal taper of the spindle 3. Thus the nose tube 34 cannot move forward when a forward axial force is applied to it. The barrel of the nose tube 34 is a sliding fit within the bore of the spindle 3. A compression tube 35 also forms a sliding fit within the bore of the spindle 3 and is provided with an internal taper, the slope of which opposes that of the taper of the nose tube 34. A collet 36 fits within the nose tube 34 and the compression tube 35. The collet 36 has a front frusto-conical end 37 which mates with the internal tapers of the nose tube 34, and has a back frusto-conical end 38, which mates with the internal taper of the compression tube 35. A sleeve 39, provided with slits 40, fits inside the collet 36. The front end of the sleeve 39 is held against the shoulder 32 of the nose tube 34 by the action of a spring 41 bearing against a shoulder 42 of the compression tube 35.

A cutting tool T fits within the sleeve 39, its back end having a dog 43 which fits in a recess of a plunger 44. A push rod 45 is attached to the plunger 44 by means of a pin 46. An enlarged portion of the plunger 44 is fixed against relative rotary movement to the compression tube 35 by a key 47. The plunger 44 is, however, movable axially relative to the compression tube 35, since the key 47 is slidable within an elongated keyway. The plunger 44 is held in its front position by a spring 48 bearing against a piston 49 which is slidable within the bore of the spindle 3. The space between the back of the piston 49 and a shoulder 50 of the spindle 3 is occupied by Belleville washers 51. The assembly of the retaining ring 31, the nose tube 34, the collet 36, the compression tube 35 and the piston 49 is such that the Belleville washers 51 are in a state of compression and thus act to force the compression tube 35 forward. The push rod 45 is slidable within a draw bar 52 which is integral with the piston rod 49.

Both the push rod 45 and the draw bar 52 extend beyond the back end of the spindle 3 into a recess 53 within a hydraulic piston 54 which is slidable within a composite cylinder 55. Screwed into the piston 54 is a pulling member 56 which is prevented from unscrewing by a locking ring 57 engaging with a flat 58 on an extension of the pulling member 56. The locking ring 57 is prevented from rotating by a pin 59 which engages in one of eight recesses in the locking ring 57, and is held in contact with the pin 59 by a spring 60. The pulling member 56 is provided with a U shaped end which bears against a bearing ring 61 threaded on the end of the draw bar 52, along which the position of the bearing ring 61 is adjustable.

The cylinder 55 comprises a barrel 62 to which is fixed the front cylinder head 63 and a back cylinder head 64. End plates 65 and 66 are fixed respectively between the back cylinder head 64 and the barrel 62 and between the front cylinder head 63 and the barrel 62. The front cylinder area is connected via a passage, which is not shown, in the barrel 62 to a flexible hose, also not shown, which communicates directly to a 1,500 p.s.i. hydraulic main. The back cylinder area communicates via a passage 69 to a flexible hose 70 which can be connected through a three-way selector (not shown) to the 1,500 p.s.i. hydraulic main or to a tank.

A push rod 71 projects through a bracket 72 attached to the casting 1. The spring 60 urges the piston 54 forward and bears between the bracket 72 and the locking ring 57. Forward movement of the piston 54 is restricted by its contact with the plate 66.

The push rod 71 extends through the pulling member 56 and is provided with a pusher face 77 at its back end. The pusher face is operable to move two arms, only one of which, 78, can be seen in FIGURE 1. The two arms 78 swing about pivots 79 fixed to the casting 1 and in moving anti-clockwise about their pivots 79 trip microswitches 80, of which only one again can be seen in FIGURE 1. A stop 81 attached to the back cylinder head 64 prevents the push rod 71 being moved forward beyond a preset position by a spring 82 held in tension between the bracket 72 and the arms 78, the object of the spring 82 being to keep the arms 78 and the pusher face 77 in contact.

Attached to the casting 1 is a pneumatic brake comprising a block 83 (see FIGURES 1 and 2) in which are bored four cylinders 84. Each cylinder contains a bellows 85 attached to a sealed housing 86 held in against air pressure within the cylinder 84 by a retaining plate 87 which abuts a brake disc 88. The cylinder 84 communicates with an annular space 89 which in its turn communicates via further passages with air pressure supply pipe 90. Inside the bellows 85 is a plunger 91 which is a sliding fit inside the sealed housing 86 and which transmits movement of the bellows 85 to the brake disc 88. The brake disc 88 is slidably mounted on two pins 92 (see FIGURE 2) and is held in a retracted position by two return springs 93.

The operation of the cutting head will now be described. To start up the head, hydraulic fluid from the 1,500 p.s.i. main is admitted, via the flexible hoses to both sides of the cylinder 55. Since the cross-sectional area of the back side of the piston 54 exceeds the cross-sectional area of its front side, the piston 54 moves forward until it abuts the end plate 66 when both the piston 54 and the cylinder 55 move forward. This forward movement stops when the circlip 73 comes into contact with the bracket 72. The hydraulic cylinder 55 and its piston 54 are then in operating position.

To select a cutting tool, it is necessary to align the spindle 3 and the shank of the desired cutting tool within the limits set by the amount the chuck opens, this amount being of the order of .003" on the diameter of the sleeve 39. As described in copending United States Patent No. 3,171,327, granted March 2, 1965, the cutting head moves in the X plane and the magazine or store in which the tool is located moves in the Y plane until the tool and the spindle 3 are aligned.

While the cutting head is moving, instructions carried on a tape activate the chuck to open. The three-way selector (which is not shown) connects the flexible hose 70 to the tank. The pressure difference between the front and back sides of the cylinder 55 causes it to move forward until the front end of the brake disc 88 comes to rest against the back end of the end cap 26. During this last movement the force exerted by the spring 60 on the pulling member 56 is sufficient to hold the piston 54 at rest and therefore to cause the cylinder 55 to move. As soon as the cylinder 55 comes to rest, the piston 54 starts to move backward. As the piston 54 moves, the pulling member 56 moves with it, until it comes to bear against the bearing ring 61 which then moves backward. The total backward movement of the bearing ring 61, of the draw bar 52 and the piston 49, which move with it, is of the order of .020". This movement is sufficient to compress the Belleville washers 51 further and thus to remove the forward acting force exerted by the piston 49 on the compression tube 35. As soon as this forward acting force is removed its radial component acting through the frusto-conical ends 37 and 38 of the collet 36 on the slit sleeve 39 is also removed. The sleeve 39 is thus allowed to expand to its uncompressed diameter and the chuck is open.

When the chuck is open and the spindle 3 and the tool shank are aligned to within .003", the cutting head moves forward in the Z plane to a predetermined position. The predetermined position varies with the effective length of the cutting tool selected and is regulated by the taped instructions. As the cutting head moves forward the shank of the tool is inserted into the sleeve 39. The spindle 3 is rotated slowly by opening the control valve to the hydraulic fluid jet (neither of which is shown) operating the pelton wheel 24. As soon as the dog 43 engages in the corresponding recess in the plunger 44, the spindle 3 is brought to rest. The three-way selector then admits pressure to the flexible hose 70 and thus to the portion of the cylinder 55 behind the piston 54. Due to the greater cross-sectional area of the back portion of the piston 54, it moves forward until its front end comes to rest against the front end plate 66. Forward movement of the piston 54 and the piston rod 56 allows the draw bar 52 and the piston 49 to move forward. By the time the piston 54 and the cylinder 55 come to rest due to the circlip 73 coming into contact with the bracket 72, the Belleville washers 51 are again exerting their designed forward thrust on the piston 49. This thrust is transmitted directly to the compression tube 35. Due to the back frusto-conical end 38 of the collet 36 and the mating portion of the bore of the compression tube 35 this thrust is transferred into a skin force normal to the two surfaces. The normal force then has two components, a force directed radially inward over the circumference of the back frusto-conical end 38 of the collet 36 and a forward force directed over the cylindrical portion of the collet 36. The forward force is similarly divided into two components due to the front frusto-conical end 37 and the mating portion of the bore of the nose tube 34, a radially inward force acting around the circumference of the front frusto-conical end 37 and a forward axial force. This latter forward axial force acts to wedge the front frusto-conical end 37 into the taper 33 of the nose tube 34 and to wedge the retaining ring 31 between the nose tube 34 and the mating portion of the spindle 3. Thus there are two radially inward directed forces acting on the slit sleeve 39. These forces partially close up the slits 40 and reduce the diameter of the sleeve 39 so that the tool T is gripped sufficiently tightly to resist the torque necessary for cutting. The radial forces cannot move the sleeve 39 axially, while any axial movement due to frictional force between the collet 36 and the sleeve 39 is resisted by the sleeve 39 being in contact with the shoulder 32 of the nose tube 34. The sleeve 39 thus remains stationary relative to the spindle 3, while gripping the tool T.

After the tool T is gripped, the cutting head traverses in the X plane and the pallet, on which the tool magazine and workpiece are located, traverses in the Y plane until the tool and a datum surface are in line. During this movement the chuck opens as described hereinfore. When the tool and the datum surface are aligned and the chuck open, the cutting head moves forward in the Z plane until the front end of the spindle 3 is a predetermined distance from the datum surface. This predetermined distance is dependent on taped instructions and differs for each nominal length of cutting tool. It is, however, always less than the nominal length so that as the cutting head approaches the predetermined position the front end of the tool comes to rest against the datum surface. Further forward movement of the cutting head leads to the tool moving backward relative to the spindle 3 and to backward movement of the plunger 44 against the action of the spring 48 and of the push rod 45. Since the chuck is open, the cylinder 55 is in its forward position thus reducing the gap between the push rod 45 and the second push rod 71. Backward movement of the push rod 45 is therefore transmitted to the second push rod 71 which in its turn moves the arms 78 in an anti-clockwise direction about their pivots 79. The predetermined distance and the nominal length of the tool are chosen and calculated so that anti-clockwise movement of the arms 78 makes contact in one only of the microswitches 80. If the wrong tool is selected, either both microswitches make contact or neither does, the former in the case of a tool having too great a nominal length and the latter when the nominal length is too small. Only when the correct microswitch has made contact will the machine tool continue to accept and carry out subsequent taped instructions. Thus the possibility of damage is safeguarded should a tool of incorrect length be gripped.

After the completion of the machining operation the rotation of the spindle is stopped by means of the pneumatic brake. Air pressure is admitted through the supply pipe 90 and via the annular space 89 to each of the cylinders 84. The pressure acts against each of the bellows 85 which are thereby compressed. The plunger 91 accordingly moves forward and in so doing moves the brake disc 88 in the same direction until it comes to bear against the rear of the end cap 26. Friction between the brake disc 88 and the end cap 26 causes the latter to slow down and finally to stop rotating and with it the whole of the cutting spindle. The cutting head and the empty tool storage position on the pallet are again aligned. The cutting head moves forward in the Z plane, the chuck opens and the tool is inserted into the tool storage where it is gripped. The cutting head moves backward, the tool is left behind, and plunger 44 moves forward under the action of the spring 48. The cutting head is now in readiness to pick up the next tool for the following machining operation.

The forward end of the spindle 3 has been kept as small as possible in diameter. This "slimness" enables the tool T to penetrate further into bulky workpieces than would be possible with a spindle whose forward end was of larger diameter. Ideally, a long tool would be best for penetration and for preventing obstruction, but such a solution poses problems with a greatly decreased tool stiffness.

What we claim as our invention and desire to secure by Letters Patent is:

1. A gripping device for gripping a rod-like article in a rotatable spindle, comprising a collet having a front and a back conical end, a sleeve insertable in the collet within which the rod-like article is gripped, a nose tube rigidly held in the spindle mating with the front conical end and provided with a projection against which the sleeve is abuttable, a compression tube mating with the back conical end, means to apply a forward axial force to the compression tube so that the collet is compressed between the nose and the compression tube whereby a radial force is exerted by the sleeve to grip the rod-like article and further means to apply a secondary forward axial force to the sleeve so that it is held in contact with the projection of the nose thereby preventing the rod-like article from forward movement.

2. A device as claimed in claim 1 wherein said sleeve is longitudinally split.

3. A device as claimed in claim 1 wherein said compression tube has a forwardly facing shoulder and said means to apply a secondary forward axial force to the sleeve comprises a spring bearing against said sleeve and said shoulder.

4. A device as claimed in claim 1 wherein said means to apply a forward axial force to the compression tube comprises an hydraulically actuated piston.

References Cited by the Examiner

UNITED STATES PATENTS

| | | | |
|---|---|---|---|
| 2,404,385 | 7/46 | Fritts | 279—50 |
| 2,606,767 | 8/52 | Preston | 279—50 |
| 2,705,641 | 4/55 | Simpson | 279—51 |
| 2,805,865 | 9/57 | Arp | 279—51 |

ROBERT C. RIORDON, *Primary Examiner.*